No. 726,075. PATENTED APR. 21, 1903.
J. KRESS.
LEMON SQUEEZER.
APPLICATION FILED NOV. 22, 1902.
NO MODEL.
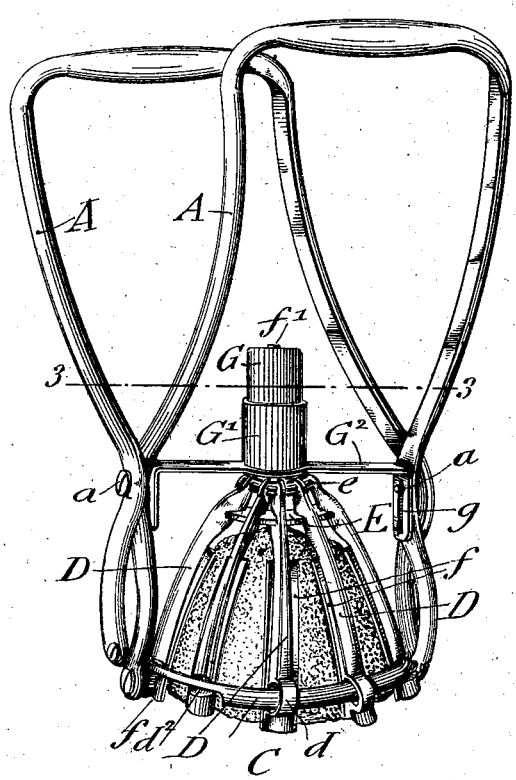
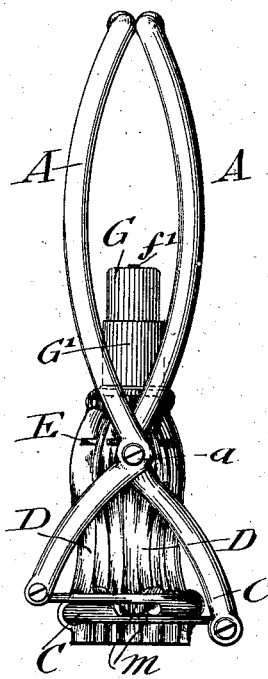
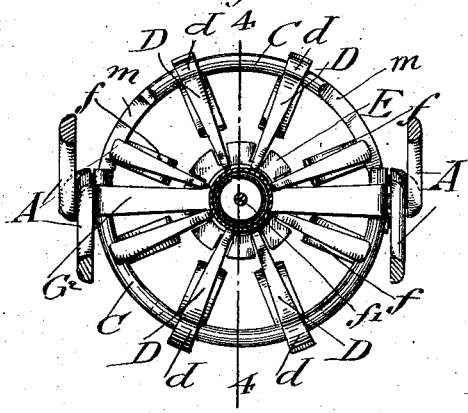
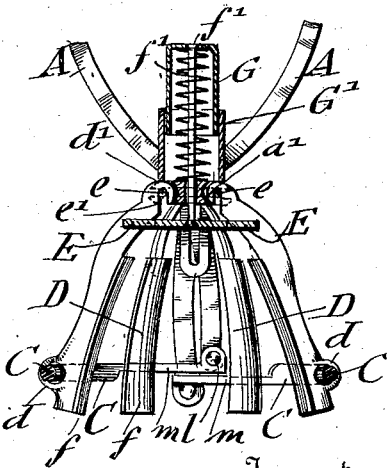

UNITED STATES PATENT OFFICE.

JOHN KRESS, OF NEW ROCHELLE, NEW YORK.

LEMON-SQUEEZER.

SPECIFICATION forming part of Letters Patent No. 726,075, dated April 21, 1903.

Application filed November 22, 1902. Serial No. 132,375. (No model.)

*To all whom it may concern:*

Be it known that I, JOHN KRESS, a citizen of the United States, residing in New Rochelle, in the county of Westchester and State of New York, have invented certain new and useful Improvements in Lemon-Squeezers, of which the following is a specification.

This invention relates to an improved lemon-squeezer which is so constructed that the operation of the fingers in taking hold of and pressing out the juice from the halves of a lemon is imitated in a very effective manner, and thereby a convenient, easily-operated, and very effective squeezer for pressing out the juice of the lemon is obtained; and the invention consists of a lemon-squeezer comprising two handle-levers fulcrumed together and connected at their lower ends with two semicircular jaws overlapping at their ends, carrying curved and converging fingers that are placed loosely on said jaws, the upper ends of said fingers being pivoted to a crown-piece and guided in radial recesses of a guide-disk connected by a stem passing through the crown-piece with a sliding and spring-cushioned portion, so that the jaws of the squeezer are returned into open position after each compression.

The invention consists, further, of a brace for the levers, that is provided with bent-up and slotted ends guided on the fulcrums of the handle-levers, said transverse brace carrying at its center a socket for the spring-cushioned slide-piece; and the invention consists, lastly, of certain details of construction and combinations of parts, which will be fully described hereinafter and finally pointed out in the claims.

In the accompanying drawings, Figure 1 represents a perspective view of my improved lemon-squeezer. Fig. 2 is a side elevation of the same, showing the lemon-squeezer in closed position. Fig. 3 is a horizontal section on line 3 3, Fig. 1; and Fig. 4 is a vertical transverse section on line 4 4, Fig. 3.

Similar letters of reference indicate corresponding parts.

Referring to the drawings, A represents two handle-levers, each of which is made approximately of U shape, the transverse upper ends of the levers being rounded off, so as to form handles for conveniently grasping the same between the palm and fingers of the hand. The lower ends of the handle-levers A A form an obtuse angle with the curved upper ends of the same, the lower end of one handle-lever being made longer than the end of the other handle-lever, while the levers are connected by fulcrums $a$ $a$ at their adjacent angular portions, as shown clearly in Figs. 1 and 2.

To the lower ends of the handle-levers A A are pivoted semicircular jaws C, which are made of round shape in the body thereof and recessed at the ends, said semicircular jaws being provided at the extreme ends with perforated lugs $l$ for the pivotal connection with the lower ends of the handle-levers. The semicircular jaws extend in opposite direction to each other and overlap each other at their adjacent ends $m$, as shown clearly in Figs. 2 and 4. To these semicircular jaws C are applied, by means of eyes $d$ or recesses $d^2$ for the fingers that are located on the recessed or overlapping portion of the jaws, the lower ends of the fingers. These fingers converge in upward direction toward each other and are applied, by means of recesses $d'$ at their ends to a circular retaining-wire $e$, that is held in position on a crown-shaped center piece $e'$, as shown in Fig. 4. The converging fingers D swing by the opening or closing action of the handle-levers on the retaining-wire as they follow the motion of the jaws C. The converging fingers D are provided at their inner edges with flat faces $f$, that are cast integral with the fingers and which serve to take hold of and press half of the lemon after the same has been cut transversely into two sections, said faces producing a squeezing action on the lemon in imitation of the squeezing action produced by the fingers of the hand. The upper ends of the converging fingers below the pivotal connection of the same with the retaining-wire are guided on a radially-recessed disk-shaped plate E, which is suspended at its center from a stem $f'$, that passes through the crown-piece $e'$ of the fingers and is guided in its upper end in a center opening of the cylindrical slide-piece G, that is inserted into a cylindrical socket G', which is attached to a transverse brace G², that extends between the handle-levers near their fulcrums, the ends of the brace being bent in downward direction and provided with slots g, so as to move readily along the shanks of the fulcrums a during the operation of the handle-levers A. A helical spring is interposed between the crown-piece and the upper inclosed end of the socket G, said spring exerting a pressure in upward direction on the slide-piece G with rod f' attached, and thereby on the disk-shaped plate E, so as to produce the spreading apart of the fingers, their connecting-jaws, and the lower ends of the jaw-levers, so as to produce automatically the opening of the lemon-squeezer. When the handles are pressed by taking hold of the same with the fingers, the jaws are moved inwardly, so that their flattened ends overlap each other, the fingers following the inward motion of the jaws and producing by the pressure at their upper ends on the recessed disk-shaped guide-plate E a downward motion of the same, so as to draw the slide-piece G in downward direction into the socket G', and thereby compress the helical spring in the slide-piece and socket to tension. This position of the parts is shown in Fig. 2, in which the lemon-squeezer is shown in closed position, so that the fingers exert a squeezing action on the section of the lemon held between the same. As soon as pressure on the handles is released the helical spring is permitted to expand, thereby drawing up the guide-disk E, so that the parts return into their normal open position ready to receive the next section of lemon to be squeezed.

The improved lemon-squeezer is preferably made of malleable iron and finished in nickel or silver plate. As all the exposed parts can be readily separated and replaced, one or more broken parts can be readily replaced, and there are no open springs that are liable to corrosion by contact with the lemon-juice, the springs employed being stored away in the box-shaped casing formed by the slide-piece and socket G G', while the handle-levers are retained in proper position by the transverse brace connecting the socket with the fulcrums of the handle-levers. The lemon-squeezer produces an effective squeezing action on the lemon and imitates closely the action of the fingers of the hand on the same and produces a more powerful squeezing action by the uniform compressing motion of the fingers on the lemon held between the same.

Having thus described my invention, I claim as new and desire to secure by Letters Patent—

1. A lemon-squeezer, consisting of fulcrumed handle-levers, jaws at the lower ends of said handle-levers, a crown-piece, a plurality of fingers applied at their lower ends to said jaws and pivoted at their upper ends to said crown-piece and means for returning said fingers and jaws into open position after the pressure on the handle-levers is released, substantially as set forth.

2. A lemon-squeezer, consisting of fulcrumed handle-levers, jaws at the lower ends of said handle-levers and overlapping each other at their inner ends, a crown-piece provided with a retaining-wire, a plurality of converging fingers applied at their lower ends to said jaws and pivoted at their upper ends by said retaining-wire, and means for returning said fingers and jaws into open position after the pressure on the handle-levers is released, substantially as set forth.

3. A lemon-squeezer, consisting of fulcrumed handle-levers, semicircular jaws pivoted to the lower ends of said handle-levers and overlapping each other at their inner ends, converging fingers applied at their lower ends to said jaws and pivoted at their upper ends, a crown-piece provided with a retaining-wire to which the upper ends of the fingers are connected, and a spring-actuated guide-disk provided with recesses for the upper ends of the fingers, said disk serving for returning the fingers and jaws into open position after the pressure on the handle-levers is released, substantially as set forth.

4. A lemon-squeezer, consisting of fulcrumed handle-levers, semicircular jaws pivoted to the lower ends of said handle-levers and made to overlap each other at their ends, converging fingers provided with eyes or recesses at their lower ends for being applied to said jaws, a crown-piece provided with a retaining-wire for pivoting the upper ends of said fingers thereto, a radially-recessed disk or guide-plate located below the upper pivoted ends of the fingers, a stem attached to said guide-plate passing through the crown-piece, a slide-piece attached to the upper end of said stem, and a helical spring interposed between said slide-piece and the crown-piece, substantially as set forth.

5. A lemon-squeezer, consisting of fulcrumed handle-levers, jaws pivoted to the lower ends of said handle-levers and recessed at their overlapping portions so as to pass one over the other, fingers applied by exterior eyes or recesses to the semicircular jaws, said fingers being provided with enlarged faces at their inner edges, a crown-piece, means for pivoting the upper ends of the fingers to said crown-piece, a radially-recessed disk or guide-plate located below the upper pivots of the fingers, a guide-socket above said crown-piece, a transverse brace connecting said socket with the fulcrums of the handle-levers, and a spring-actuated slide-piece connected with the disk or guide-plate and guided in said socket, substantially as set forth.

6. In a lemon-squeezer, the combination, with fulcrumed handle-levers, of semicircular jaws pivoted to the lower ends of said handle-levers and arranged to overlap each other at their ends, converging fingers applied at their lower ends to said jaws, a crown-piece, means for pivoting the upper ends of the fingers to said crown-piece, a brace extending between the fulcrumed handle-levers above the crown-piece and provided with downwardly-bent slotted ends for the fulcrums of the levers, and a spring-actuated guide-plate provided with radial recesses located between the upper ends of the fingers for returning said fingers, jaws and handle-levers into their normal position after pressure on the handle-levers is released, substantially as set forth.

In testimony that I claim the foregoing as my invention I have signed my name in presence of two subscribing witnesses.

JOHN KRESS.

Witnesses:
PAUL GOEPEL,
C. P. GOEPEL.